United States Patent [19]

Uemura et al.

[11] Patent Number: 4,830,867

[45] Date of Patent: May 16, 1989

[54] PROCESS FOR PRODUCING PASTA SHEETS

[75] Inventors: Isao Uemura; Yasuo Takagaki, both of Oizumimachi; Yoshitaka Arai, Ashikaga; Isamu Ami, Oizumimachi, all of Japan

[73] Assignee: Ajinomoto Co., Inc., Tokyo, Japan

[21] Appl. No.: 855,573

[22] Filed: Apr. 25, 1986

[30] Foreign Application Priority Data

Oct. 22, 1985 [JP] Japan ................................ 60-235801

[51] Int. Cl.$^4$ .............................................. A23L 1/00
[52] U.S. Cl. ..................................... 426/557; 426/138
[58] Field of Search ............... 426/557, 451, 458, 661, 426/549, 138

[56] References Cited

U.S. PATENT DOCUMENTS

| | | | |
|---|---|---|---|
| 2,677,613 | 5/1954 | Shiah | 426/557 |
| 3,780,186 | 12/1973 | Troy | 426/557 |
| 3,836,680 | 9/1974 | Salza | 426/661 |
| 3,846,563 | 11/1974 | Cunningham | 426/557 |
| 4,076,846 | 2/1978 | Nakatsuka et al. | 426/138 |
| 4,098,906 | 7/1978 | Hesaki et al. | 426/451 |
| 4,243,690 | 1/1981 | Murakami et al. | 426/451 |
| 4,368,210 | 1/1983 | Murakami et al. | 426/557 |
| 4,370,352 | 1/1983 | Murakami et al. | 426/557 |

OTHER PUBLICATIONS

Rietz 1965, A Guide to the Selection, Combination and Cooking of Foods, vol. 2, AVI Publishing, Westport, Conn., pp. 48–51.

*Primary Examiner*—Donald E. Czaja
*Assistant Examiner*—Carolyn Paden
*Attorney, Agent, or Firm*—Sughrue, Mion, Zinn, Macpeak & Seas

[57] ABSTRACT

A process for producing pasta sheets which comprises adding water to a starching flour comprising raw starch: α-starch in a weight ratio of about 95:5 to about 35:65, kneading the mixture and thereafter extending the mixture. Products having excellent transparency and machinability are obtained.

6 Claims, No Drawings

PROCESS FOR PRODUCING PASTA SHEETS

FIELD OF THE INVENTION

This invention relates to a process for producing pasta sheets for use as coverings for gyoza (Chinese fried or steamed dumplings stuffed with minced pork), shaomai (Chinese steamed dumplings stuffed with minced pork), Chinese cakes, wonton (Chinese dumplings stuffed with minced pork, deep fat fried or served in a soup), etc.

BACKGROUND OF THE INVENTION

In general, pasta sheets for producing coverings for gyoza, shaomai, Chinese cakes, wonton, etc., are produced by adding water to wheat flour, kneading, extending and molding, and the main starting material is wheat flour regardless of the use.

While, in addition to wheat flour, cereal flour such as rice flour, corn flour, soybean flour, etc., as well as buckwheat flour, etc., and starch other than the cereal flour may also be used as a starting material for producing pasta sheets, wheat flour is special among these starting materials. When wheat flour is kneaded with water, the wheat protein forms gluten generating a unique glutinuousness and functions as a binding substance to enhance the pasta sheet strength. Since other cereal flours do not have these properties, wheat flour has hitherto been not only used for pasta but also essential as a binding substance for producing pasta where other cereal flours are also present.

Thus, in the conventional production of pasta sheets, wheat flour has been the main ingredient and the pasta sheet strength has been achieved by the presence of wheat gluten. On the other hand, in order to improve the softness of the pasta sheet and also to impart a transparent appearance to the sheet, a process for producing pasta sheets by adding raw starch to wheat flour is known.

However, where wheat flour and raw starch are used in combination, the degree of transparency of the pasta sheet produced is low, and, for example, in the case of gyoza, etc., it is difficult to obtain a commercial product having a see-through covering so that the color of the filling can be seen through the covering.

In order to enhance the degree of transparency of the pasta sheet, it is difficult to use a starting material mainly comprising starch, and transparent coverings which have hitherto been manually produced are made from wheat starch alone by adding hot water thereto, kneading, extending using a rolling pin, etc., and incorporating a filling.

As has been described hereinabove, in order to obtain pasta sheets having a high degree of transparency, it is important to produce them mainly from starch. However, the pasta sheet strength is inadequate where the pasta sheet is produced industrially by machine, and thus molding by machine is almost impossible.

Therefore, with the conventional process employing wheat flour and starch in combination and comprising adding water and kneading or the process also conventionally used and comprising adding hot water to wheat starch, kneading and molding the transparency of pasta sheets is poor, or even if transparency is obtained, the production thereof on an industrial scale is impossible from standpoints of mechanical strength, glutinuousness, etc., of pasta sheets.

SUMMARY OF THE INVENTION

Under these circumstances, intensive research has been conducted to develop a process for producing pasta sheets which have excellent machinability and which have good transparency and it has been discovered that, by using in combination α-starch in a certain proportion to raw starch, water addition may be effected using water at normal temperature and also coverings which have excellent machinability and also which have a high degree of transparency can be obtained, thereby this invention has been achieved.

Accordingly, this invention provides for producing pasta sheets which comprises
adding water to a starting flour comprising raw starch:α-starch in a weight ratio of about 95:5 to about 35:65,
kneading the mixture and
thereafter extending the mixture.

DETAILED DESCRIPTION OF THE INVENTION

The raw starch component used in this invention can be a raw starch such as wheat starch, sweet potato starch, potato starch, tapioca starch, rice starch, corn starch, etc., and also includes raw cereal flour such as wheat flour, rice flour, etc. These materials may be used alone or as a combination of two or more thereof. Preferably, raw starch, more preferably raw wheat starch, is employed alone, and where cereal flour such as wheat flour, etc., is used, the proportion of the cereal flour present in the raw starch component preferably is about ½ by weight or less.

α-starch is prepared by drying starch paste before retrogradation and the α-starch component is used in an amount of about 1/20 to about 2 times by weight that of the raw starch component. The α-starch is that obtained by adding water to starting starch, heating to gelatinize the starch and drying while avoiding retrogradation. The kind of starch used initially and the production process (e.g., roll process, extruder process, etc.) used are not particularly limited. Therefore, the starch used initially can be wheat starch, potato starch, sweet potato starch, tapioca starch, rice starch, corn starch, etc., of which wheat starch and potato starch are preferred. If the ratio by weight of the α-starch component to the raw starch component is less than about 5:95, the pasta sheet strength is weakened with pasta breaking, etc., undesirably occurring. Hence, the moldability is deteriorated. On the contrary, if the ratio by weight of the α-starch component to the raw starch component exceeds about 65:35, the elasticity is too high and the extending of the sheet is hampered. In either case, machinability is reduced and continuous molding is difficult.

In addition to the starting flour, it is needless to say that seasoning agents such as salt, sugar, etc., flavoring agents, spices, coloring agents, emulsifiers, modifiers, etc., may also be incorporated into the mixture as auxiliary starting materials as appropriate.

A pasta sheet may be obtained by adding water to the starting flour, kneading the mixture in a conventional manner to obtain a dough and extending the dough. The water added may be either water (at room temperature, e.g., about 20°–30° C.) or hot water (about 80° C. or higher) in this invention, and, in general, in the case of water, about 70 to 30% by weight based on the weight of the starting flour is sufficient, while in the case of hot water (80° C. or higher), about 90% to 40% by weight based on the weight of the starting flour will suffice.

The pasta sheet produced may be put on a commercial line as raw pasta, or may be produced as a dried pasta after a drying treatment, but, preferably, the sheet is stuffed with a filling, heat treated if necessary and made into a product. Examples of foods comprising pasta covered by or stuffed with a filling include gyoza, shaomai, wonton, small Chinese buns, spring rolls, ravioli, etc. In order to make the best use of the transparency of the pasta sheet which is an advantageous feature of this invention, the filling for stuffing is preferably one which is colorful, such as shrimp, crab, egg, green and yellow vegetables, etc.

This invention provides pasta sheets having a high degree of transparency and also having good machinability. This enables the continuous production of the sheets on an industrial scale by using raw starch and α-starch in combination. In particular, on incorporating a filling, in the case of gyoza, etc., processing is possible without difficulties such as breaking, sticking, etc., of the covering occurring. Therefore, it is possible to present a starch processed food product satisfying the public's taste which exhibits the appearance and mouthfeeling characteristics different from those imparted by gyoza, etc., produced using conventional coverage mainly composed of wheat flour.

This invention is more particularly described by the following reference examples and examples. Unless otherwise indicated herein, all parts, percents, ratios and the like are by weight.

REFERENCE EXAMPLE 1

According to the formulation in Table 1 below, to the starting flour composed of wheat flour and wheat starch ("ESUSAN UKIKO" produced by Ajinomoto Co., Inc.) were added salt, oil and water, and the combination was stirred well using a mixer to prepare a dough.

The obtained dough was extended with an extruder and continuously molded with a gyoza molding machine to obtain gyoza. The degree of transparency of the gyoza covering obtained and the machinability at the time of pasta sheet production were evaluated. The results obtained are, as shown in Table 1, that as the proportion of the wheat starch to the wheat flour incorporated is increased, but the degree of transparency of the covering is increased but the machinability is reduced. Therefore, in either the case of the single system of the wheat flour or the wheat starch or the combined system, results which satisfy both the degree of transparency of the covering and machinability cannot be obtained.

TABLE 1

Relationship Between Starting Material and Degree of Transparency of the Coatings and Pasta Sheet Strength

| | Sample No. | | | | |
|---|---|---|---|---|---|
| | 1 | 2 | 3 | 4 | 5 |
| Kind of the Starting Material | | | | | |
| Wheat Flour | 100 | 75 | 50 | 25 | 0 |
| Wheat Starch | 0 | 25 | 50 | 75 | 100 |
| Salt* (%) | 1.5 | 1.5 | 1.5 | 1.5 | 1.5 |
| Oil* (%) | 5.0 | 5.0 | 5.0 | 5.0 | 5.0 |
| Water* (%) | 35.0 | 35.0 | 35.0 | 35.0 | 35.0 |
| Degree of Transparency of Covering | x | Δ~x | Δ | O | |
| Machinability | O | O | Δ | x | x |

: Pretty good;
O: good,
Δ: Slightly bad;
x: bad
*Weight % based on the flour

REFERENCE EXAMPLE 2

According to the formulation in Table 2 below, water was added to wheat starch ("ESUSAN UKIKO") and α-starch (starting material: potato starch) and the mixture stirred to obtain a dough, which was then extended by an extruder and continuously molded with a gyoza molding machine to obtain gyoza. The degree of transparency of the gyoza covering produced and the machinability on pasta sheet production were evaluated. As shown in Table 2, products with a good degree of transparency of the coverings and machinability at weight ratios of wheat starch:α-starch=90:10–40:60.

TABLE 2

Relationship Between Pasta Sheet Strength and α-Starch Content

| | Sample No. | | | | | | |
|---|---|---|---|---|---|---|---|
| | 1 | 2 | 3 | 4 | 5 | 6 | 7 |
| Wheat Starch | 100 | 90 | 80 | 70 | 60 | 50 | 40 |
| α-Starch | 0 | 10 | 20 | 30 | 40 | 50 | 60 |
| Water* (%) | 50 | 50 | 50 | 50 | 50 | 50 | 50 |
| Machinability | x | O | O | O | O | O | O–Δ |

O: good;
Δ: slightly bad;
x: bad

EXAMPLE 1

| Flour | |
|---|---|
| Wheat Starch | 70 parts by weight |
| α-Starch | 30 parts by weight |
| Hot Water (80–90° C.) | 50% (based on the flour weight) |

The wheat starch and the α-starch were placed in a mixer, stirred for about 2 minutes, then with stirring, the predetermined amount of water preheated to 80°–90° C. was uniformly sprayed thereonto and stirred for 10–15 minutes. The resulting dough was removed, extended using an extruder and continuously molded with gyoza molding machine to obtain gyoza. These gyoza coverings, when steamed and served for eating, had excellent transparency and also received high evaluation on mouthfeel.

EXAMPLE 2

| Flour | |
|---|---|
| Wheat Starch | 70 parts by weight |
| α-Starch | 30 parts by weight |
| Oil | 3% (based on the flour) |
| Water (room temp.) | 45% (based on the flour) |

The wheat starch and the α-starch were placed in a mixer, the mixture stirred for about 2 minutes, then, with stirring, a mixture of the predetermined amounts of the oil and water was uniformly sprayed, thereonto and stirred for 10-15 minutes. The resulting dough was removed, extended with an extruder, and continuously molded with a gyoza molding machine to obtain gyoza.

The gyoza produced were steamed and frozen to obtain frozen gyoza. These gyoza were then thawed and cooked to obtain products expected to satisfy the public's taste because the color of the filling inside could be seen.

EXAMPLE 3

| Flour | |
| --- | --- |
| Wheat Starch | 60 parts by weight |
| Potato Starch | 30 parts by weight |
| α-Starch | 10 parts by weight |
| Oil | 3% (based on the flour weight) |
| Hot Water (75–90° C.) | 90% (based on the flour weight) |

The wheat starch, the potato starch and the α-starch were placed in a mixer, and stirred for about 2 minutes. Further, with stirring, a mixture of the predetermined amounts of the oil and water was added and mixed uniformly, and the mixtures stirred for about 2 minutes to prepare dough. The dough obtained was continuously molded with a Leon bean-paste filling machine to obtain buns. These buns were steamed and frozen to obtain frozen buns.

When the frozen buns obtained were thawed and cooked, they became white and transparent, thus giving products expected to satisfy the public's taste showing the contents to some extent.

EXAMPLE 4

| Flour | |
| --- | --- |
| Wheat Starch | 55 parts by weight |
| Wheat flour | 20 parts by weight |
| α-Starch | 25 parts by weight |
| Hot Water (80–90° C.) | 55% (based on the flour weight) |

The wheat starch, the wheat flour and the α-starch were placed in a mixer, and stirred for about 2 minutes. Further, with stirring, the predetermined amount of hot water was uniformly sprayed thereonto and the mixture was stirred for 10 to 15 minutes. The resulting dough was removed, extended with an extruder, and continuously molded with a gyoza molding machine to obtain gyoza. When they were heated by steam, gyoza showing the contents to some extent were obtained.

While the invention has been described in detail and with reference to specific embodiments thereof, various changes and modifications can be made therein without departing from the spirit and scope thereof.

What is claimed is:

1. A process for producing a transparent pasta sheet wrapped around a filling which comprises
    adding water to a starting mixture comprising raw starch:α-potato starch in a weight ratio of about 95:5 to about 35:65,
    kneading the moistened mixture to form a dough,
    thereafter extending the dough to produce a transparent pasta sheet and
    wrapping the sheet around a filling.

2. The process of claim 1, wherein said raw starch is wheat starch, sweet potato starch, potato starch, tapioca starch, rice starch, corn starch, wheat flour, rice flour, or a mixture thereof.

3. The process of claim 2, wherein said raw starch is raw wheat starch.

4. The process of claim 2, wherein said raw starch comprises about 50% by weight or less of wheat flour, rice flour, or mixtures thereof.

5. The process of claim 1, wherein said process comprising additionally adding oil to said water and starting flour.

6. The process of claim 1, wherein said water is present in the amount of about 70 to about 30% by weight based on the weight of the starting flour where the water is water at room temperature or is present in an amount of about 90 to 40% by weight based on the weight of the starting flour where the water is hot water.

* * * * *